Dec. 17, 1929.                    J. C. WHITE                    1,740,133
                                WELDING APPARATUS
                              Filed May 23, 1924              4 Sheets-Sheet 1
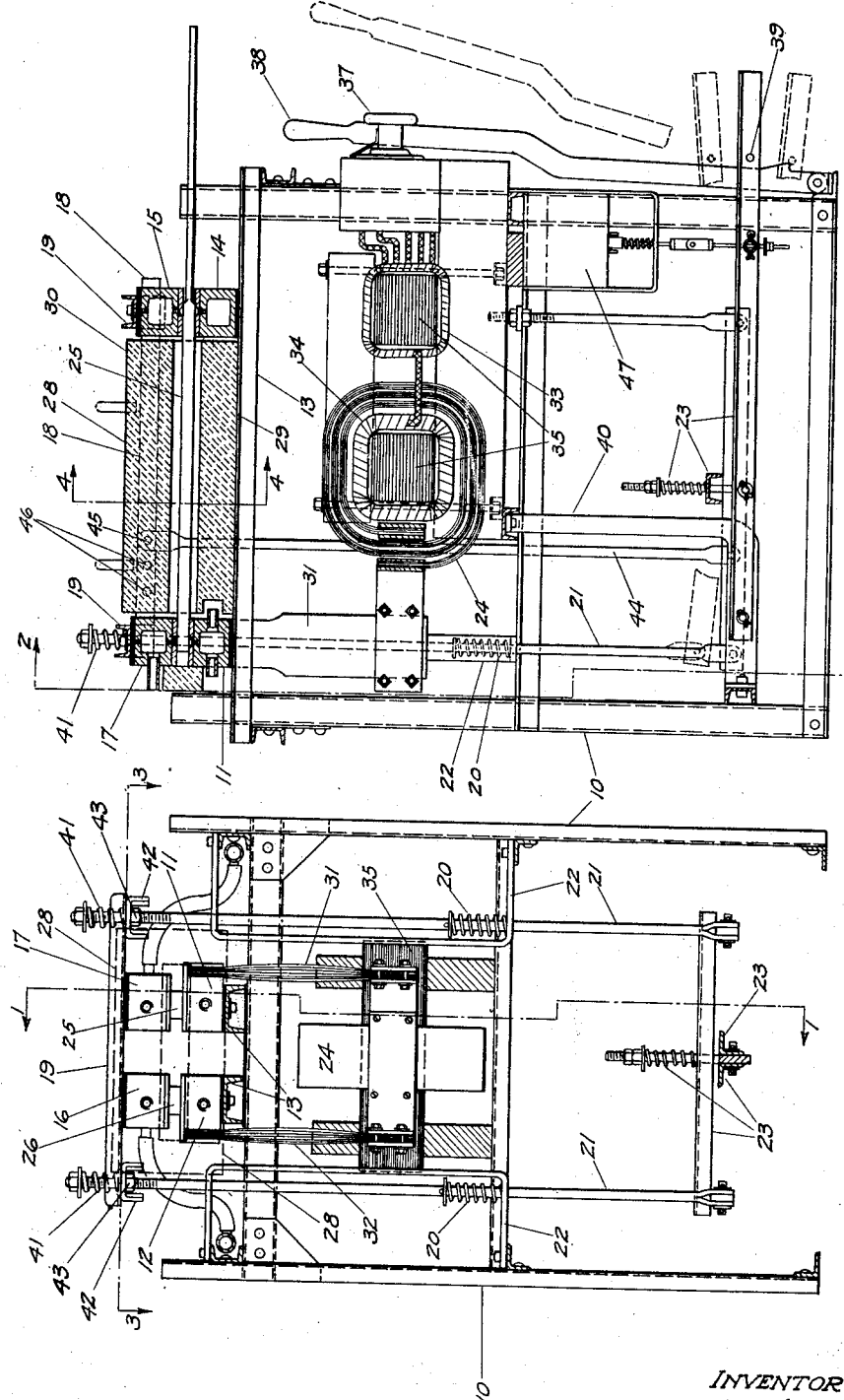
INVENTOR
John C. White
per A. B. Paré
ATTORNEY Dec. 17, 1929.  J. C. WHITE  1,740,133
WELDING APPARATUS
Filed May 23, 1924   4 Sheets-Sheet 2
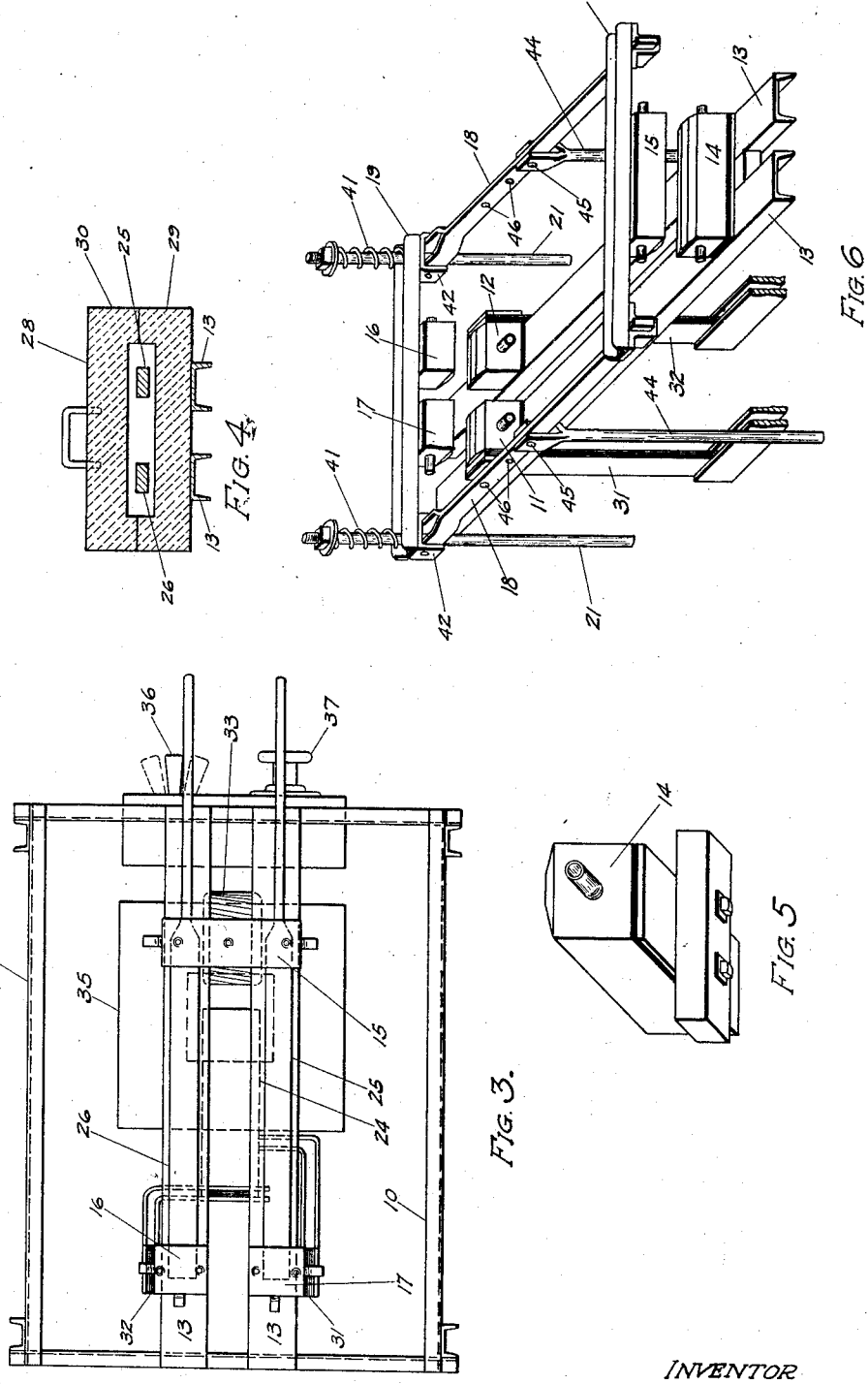
INVENTOR
John C. White
per A. S. Paré
ATTORNEY Dec. 17, 1929.   J. C. WHITE   1,740,133
WELDING APPARATUS
Filed May 23, 1924    4 Sheets-Sheet 4
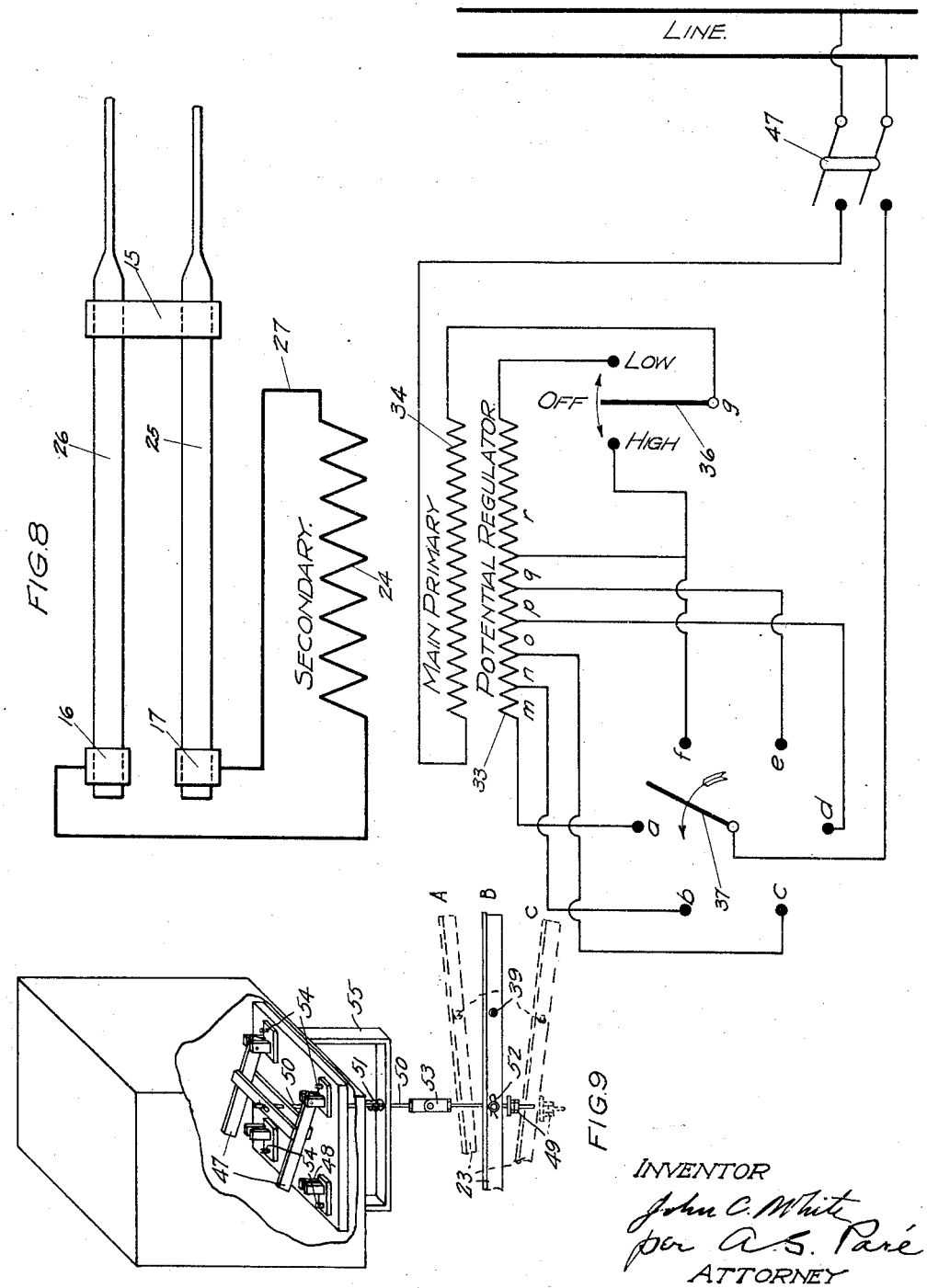

Patented Dec. 17, 1929

1,740,133

UNITED STATES PATENT OFFICE

JOHN C. WHITE, OF EUREKA, CALIFORNIA, ASSIGNOR OF FORTY-NINE ONE-HUN-
DREDTHS TO J. M. HUTCHESON, OF EUREKA, CALIFORNIA

WELDING APPARATUS

Application filed May 23, 1924. Serial No. 715,263.

This invention relates to furnaces and in particular to electrically heated furnaces, and is designed for the purpose of heating brazing or soldering irons for that class of furnaces wherein the said irons comprise the heating element.

In accordance with the principles of this invention the herein described furnace comprises, in a general way, a machine carrying electrical heat-generating apparatus and heating element within a suitable oven, or the like, constructed of any well known refractory material, preferably low in thermal conductivity and of sufficient size to accommodate brazing irons conveniently.

This furnace is designed to operate on the principle that the amount of heat generated in a given time in a section of an electric circuit by the current flowing therein varies: directly, as the length and specific resistance of that section, and the square of the current; and inversely, as the cross sectional area. And that the heat lost, etc. in that section varies directly with the specific thermal conductivity of the confining mediums.

The major object of this invention is to produce an apparatus which will electrically heat two brazing irons uniformly throughout their length.

Another object is to construct an electrically heated furnace provided with quick operating electrode clamps of water-cooled type, which make contact with the brazing irons for the purpose of passing an electric current through them, and which quickly release the irons in order that they may be easily removed from the furnace and applied to braze.

A further object is to construct an electrically heated furnace with the heating medium thereof confined within a removable oven adapted to retain the heat generated, thereby reducing to a minimum the amount of current consumed in the operation of the furnace.

Another object of this invention is to produce an electric furnace which will heat any object to a high degree in a very short period without burning or scaling said object, thereby making its application to brazing purposes and especially to that of band saws most desirable.

Other objects and advantages of this invention will appear with reference to the subjoined specification and the accompanying four sheets of drawings, in which:

Figure 1 is a side elevation, partly in section, of a brazing furnace and operating mechanism constructed in accordance with this invention and taken as indicated by the line 1—1 of Figure 2.

Figure 2 is an end elevation, partly in section, as indicated at the line 2—2 of Figure 1.

Figure 3 is a plan view of the machine frame and brazing irons and electrical connections thereto, the oven sections and lever mechanism being removed from the frame.

Figure 4 is a sectional detail of the oven sections and brazing irons taken at the line 4—4 of Figure 1.

Figure 5 is an isometric view of the front bottom movable electrode showing the guide block bolted to electrode.

Figure 6 is an isometric view of the supporting frame, stationary electrodes and movable frame and electrode clamps.

Figure 8 is an elementary wiring diagram showing the electrical connections of the primary and secondary circuits, switches, and brazing irons, which are connected in series with the secondary circuit.

Figure 9 is a perspective view of the primary quick-acting switch and the actuating mechanism therefor.

Figure 7:
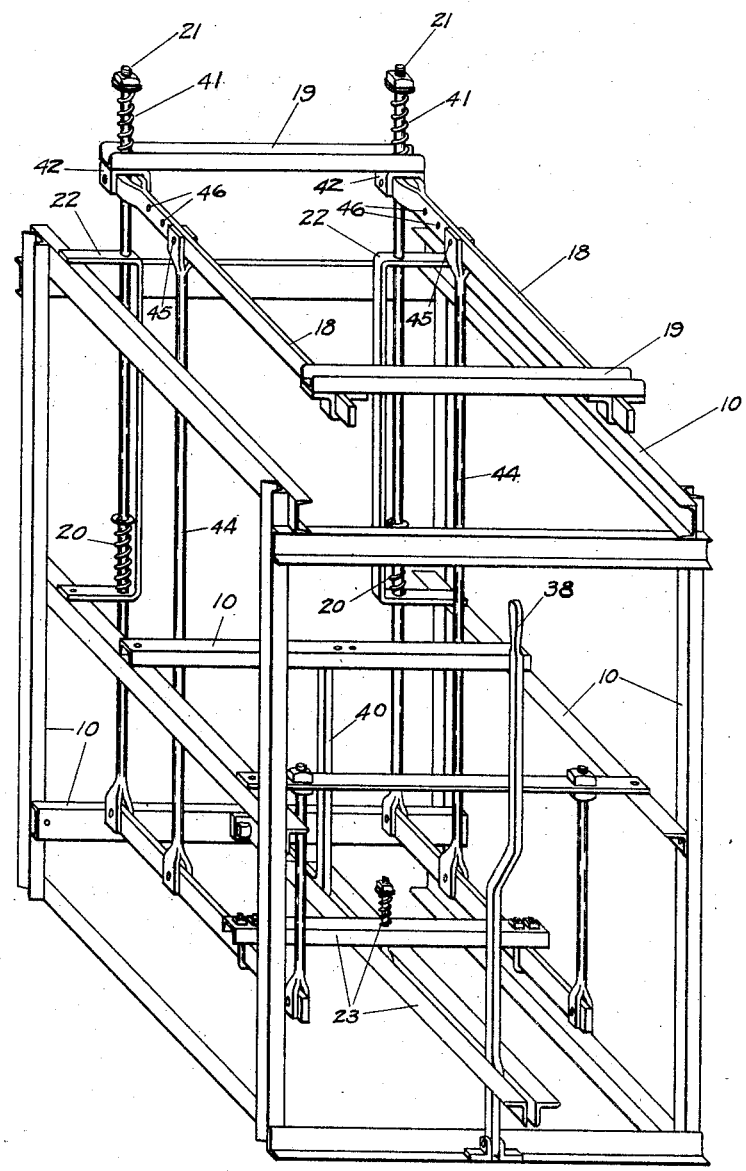
Figure 7 is an isometric view of the supporting stationary framework, movable framework and operating lever mechanism.

This invention comprises a suitable framework for supporting an oven, brazing irons, secondary electrode clamps, secondary busses, transformer of variable voltage type, primary quick-operating switch and foot-pedal lever mechanism for operating the electrode clamps. A quick-operating switch is provided in the primary circuit for the purpose of closing said circuit after the electrode clamps have closed the secondary circuit through the brazing irons, or heating element of the furnace, and for opening the primary circuit before the secondary circuit is opened.

The primary switch and electrode clamps are so connected by lever mechanism that they move in properly timed relation.

Referring more particularly to the drawings, the furnace and operating mechanism is supported by a suitable framework 10 of channel and angle iron construction, the stationary electrode sets 11 and 12 are bolted to suitable supporting bars 13 extending across the upper part of the framework 10 and insulated therefrom by any well known insulating material.

The several electrodes are provided with hose connections and a water supply for the purpose of water-cooling the same where operating conditions are severe enough to require the use of a cooling medium. The front electrodes 14 and 15 have been made movable or adjustable, and by such arrangement irons of different lengths may be heated. It is necessary to heat irons of different lengths on account of varying widths of the saws to be brazed.

All the electrodes are insulated from the frame, hollow, and water-cooled as above stated, although the hose connections are shown only to electrodes 16 and 17 as shown in Figure 2. All the other electrodes are equipped with hose connections in practice. Rubber hose or any other non-conductor of current must be used in order to prevent short-circuiting of the electrodes. The water flowing in the hose will not cause a short circuit because the resistance of water is sufficiently high to prevent noticeable flow of current at the low voltage of the secondary circuit.

The electrodes 15, 16, and 17 are fastened to a movable framework 18 as shown in Figure 6, and are insulated from the cross bars 19 and normally held out of contact with the brazing irons by means of suitable springs 20 (see Figures 1, 2 and 7), mounted upon the upright rods 21, which are held vertically by guides 22, said rods being connected at their lower ends to a foot-pedal mechanism 23 pivotally mounted in the lower end of the frame 10.

The clamp mechanism at one end of the furnace consists of two separately insulated electrodes 11 and 12 (see Figures 1, 2 and 6), to each of which a connection is furnished from the secondary winding 24 of a low voltage transformer. Each of these electrodes furnishes a connection to one end of one of the brazing irons 25 and 26. The clamp at the other end of the furnace consists of two short-circuiting electrodes 14 and 15, which electrodes make an electrical connection between the two remaining ends of the brazing irons, thus completing the circuit of the secondary winding 24 of the low voltage transformer. It will thus be seen that the brazing irons 25 and 26 become a series section of the secondary circuit; consequently the irons, which are of uniform cross sectional area, are heated uniformly throughout their length between the electrodes when current is flowing in the secondary circuit 27 (see Figure 8). The specific resistance and cross-sectional area of the secondary conductors is such that the electrical energy in the circuit is dissipated in the form of heat in the irons or heating element of the furnace.

By experiment, the area of contact with the electrodes is made just sufficiently great, so that the resistance of the contact is such that the portion of the brazing irons directly in contact with the electrodes is heated uniformly with all the other sections of said irons.

The oven 28, (see Figure 1) into which the brazing irons are inserted is constructed of refractory material low in thermal conductivity and just sufficiently large to accommodate said irons conveniently, as clearly shown in Figure 4. The oven consists of halved sections 29 and 30, the lower section 29 of which rests upon the supporting bars 13, as shown particularly in Figures 2 and 6. At each end of the furnace and forming a part of the furnace enclosure, are located the quick-operating electrode clamps which make contact with the two brazing irons for the purpose of passing the electric current through said irons. The oven is not fastened to the framework but merely rests thereon, and both halves may be easily lifted off the machine after the brazing irons have been removed.

The distribution of heat takes place by three distinct modes, which are called conduction, convection and radiation. By the first method heat is transmitted from particle to particle of a body, or from one body to another in contact with it, by a slow process which depends upon difference of temperature between contiguous parts, and upon the nature of the conducting substance.

The brazing irons 25 and 26 are preferably rectangular prisms of machined steel of equal length with small iron handles several feet long welded to one end of each for the purpose of conveniently handling the irons when heated.

Laminated copper busses 31 and 32 (see Figures 1, 2 and 6), are attached to the electrodes 11 and 12 at one end of the furnace, and lead therefrom to the secondary winding 24 of the low voltage transformer mounted below the electrodes in the frame 10.

The low voltage transformer is composed of three windings, namely, potential regulator 33, primary 34, and secondary 24, mounted on a common laminated iron core 35. Taps are brought out of the potential regulator winding 33 to segments of two selective switches 36 and 37 (see Figures 1, 3 and 8), and provide means for varying the secondary voltage and consequently the amount of current flowing through a given resistance.

In Figure 8 these two selective switches are shown, in which switch 36 has three positions, high, low and off. Switch 37 has six positions which connect different sections of the potential regulator winding 33 in series with the main primary winding 34. With switch 36 in low position and switch 37 on contact (*a*) Figure 8, the entire potential winding is connected in series with the main primary. With switch 36 in low position and switch 37 in contact with (*b*), segment (*m*) of the potential regulator winding is cut out and the remaining sections (*n*), (*o*), (*p*), (*q*), and (*r*) are in series with the main primary, and in like manner other segments are cut out, and so on. Each different position of switch 37 with switch 36 in low, and each different position of switch 37 with switch 36 in high, varies the number of turns in the primary circuit, which consequently varies the ratio of turns primary to turns secondary, thus varying the voltage of the secondary circuit. The quantity of current that will flow in a given time through the secondary circuit of a given resistance will vary directly with the voltage, and the quantity of heat generated in that circuit will vary as the square of the current. Switches 36 and 37 may be shifted in twelve different combinations, which result in twelve different voltages (from four volts to twelve volts). The machine will produce, with the above mentioned variations of current, the required amount of heat for any sized brazing irons used for ordinary brazing purposes.

The heating element of the furnace attains a temperature of approximately twenty-six hundred degrees Fahrenheit in from six seconds to ten minutes, which is adequately sufficient for ordinary brazing purposes. The heating element may be brought to a temperature as high as six thousand one hundred and fifty-two degrees Fahrenheit or much higher depending upon the metal used in said element. This method heats the brazing irons uniformly through their length, and is a decided advantage in that it saves both time and energy.

A locking lever 30, as shown in Figures 1 and 7, is pivotally mounted to the front end of the machine, and the lower end is provided with a notch adapted to engage the pin 39 in the forward end of the foot-pedal mechanism 23. This lever holds the electrode clamps 15, 16, and 17 in contact while the brazing irons are being heated.

The foot lever mechanism 23 is pivoted on the bent bar 40, Figures 1 and 7, which bar is bolted to the lower framework 10. Compression springs 41, at top of rods 21, Figures 2, 6, and 7, and hold bar 19 and stirrup 42 against nuts 43 (see Figure 2), thereby holding the moving framework 18 in a horizontal plane when electrode clamps are open.

When electrode clamps are closed and are in contact with brazing irons, springs 41 are compressed slightly and rods 44 take the major part of of the strain. Framework 18, being free to pivot on pins 45 tends to equalize the pressure of the electrode clamps at both ends of the brazing irons, thereby assuring equal electrical contacts. By adjusting rod 44 to holes 46, equality of pressure at both ends of brazing irons may be obtained for different lengths of brazing irons. Primary quick operating switch 47, Figures 1 and 8, is located below the transformer and is operated by foot pedal mechanism 23.

It will be noted from the foregoing that I have provided a furnace especially adapted to heating brazing irons for brazing band saws and the like, although it is to be understood that the same may be applied to advantage for brazing purposes in many other arts that require quick and uniform heating of the brazing element; and may be applied also to advantage for heating irons or other elements where the heated element is used in any art, such as the shaping of the element itself or the welding of the two elements while at welding heat.

The fact that the brazing element is enclosed in a furnace of low thermal conductivity makes the heat losses negligible and reduces the fire risk to a minimum which is of a decided advantage.

Having thus described my invention, and an embodiment of it, in the full, clear, and exact terms required by law, and believing that it comprises novel, useful, and valuable improvements in the art to which it pertains, I here state that I do not wish to be limited to the precise construction and arrangement of the several parts, as herein set forth, as the same may be variously modified by a skilled mechanic without departing from the spirit and scope of my invention as defined in the appended claims.

What I claim and desire to secure by Letters Patent of the United States, is the following, to-wit:

Claims:

1. An electrical brazing furnace comprising an electrical heat-generating apparatus consisting of a transformer embodying a primary and a secondary winding, a plurality of electrode clamps arranged in pairs, the upper clamp of each pair being adjustable relative to its companion clamp and a certain pair of said clamps being spacedly adjustable relative to the other pair, a heat-confining element arranged between said pairs of clamps, and means coacting with said clamps to move the upper of these into operative positions relative to their respective companion clamps to close the circuit.

2. An electrical brazing furnace comprising an electrical heat-generating apparatus consisting of a transformer embodying a primary and a secondary winding, a plurality of electrode clamps arranged in pairs, the upper clamp of each pair being vertically adjustable relative to its companion clamp, and a certain pair of said clamps also adjustable as a unit relative to the other pair, a heat-confining element arranged between said pairs of clamps, and actuating means coacting with the upper clamps to cause them to assume operative positions relative to their respective companion clamps.

3. In a device of the class described, a heat-generating apparatus comprising a transformer embodying a primary and a secondary winding, a plurality of electrode clamps arranged in pairs, the upper clamp of each pair being vertically adjustable relative to its companion clamp, a certain pair of said clamps being also slidable as a unit relative to the other pair, and actuating means cooperating with the upper clamps to cause them to assume operative contact with their respective companion clamps.

4. An electrical brazing furnace comprising electrical heat-generating apparatus, a primary and a secondry circuit, a plurality of electrode clamps arranged in pairs, the upper clamps of which are vertically adjustable relative to their companion clamps, means for connecting said clamps in series, a heat-confining element, means adapted to prevent the closing of the primary circuit until the secondary circuit is closed, means adapted to prevent the opening of the secondary circuit until the primary circuit has been opened, and means for actuating the upper electrode clamps to close the circuit.

5. In a device of the class described, a supporting frame, a plurality of electrode clamps arranged in superposed pairs thereon, the upper clamp of each pair being adjustable vertically relative to its companion clamp, means coacting with the upper clamps to cause their vertical clamping movements, means connecting said clamps in series when in clamped positions, and means whereby a certain pair of said clamps is adapted for horizontal movement on the supporting frame relative to the other pair, due to expansion of metals caused by the closing of the electric circuit.

6. An electrical brazing furnace comprising, in combination, a suitable supporting frame, an actuating mechanism mounted in said frame and comprising vertically movable spring-pressed rods and electrode-clamp supporting bars, a plurality of electrode clamps arranged in pairs, the lower clamp of each pair being mounted upon the supporting frame and the upper clamp of said pairs being carried by said supporting bars and adapted for vertical movement therewith relative to its companion clamp, heat-generating apparatus consisting of a transformer embodying a primary and a secondary winding operatively associated with said clamps and adapted to close the circuit therebetween when said upper clamps are brought to operative positions relative to their companion clamps, and guide-means carried by certain pairs of said clamps permitting their lateral movement on the supporting frame relative to the remaining clamps, to compensate for the expansion due to the heating of the various elements when the circuit is closed.

In testimony that I claim the foregoing, I have hereto set my hand this 17th day of May, 1924.

JOHN C. WHITE.